US00RE40998E

(19) United States
(12) Reissued Patent
Cho et al.

(10) Patent Number: US RE40,998 E
(45) Date of Reissued Patent: Nov. 24, 2009

(54) METHOD FOR INITIATING INTERNET TELEPHONE SERVICE FROM A WEB PAGE

(75) Inventors: Wongyu Cho, San Jose, CA (US); Seung-ho Cho, Santa Clara, CA (US); Joe S. Abuan, Fremont, CA (US)

(73) Assignee: Yahoo! Inc., Sunnyvale, CA (US)

(21) Appl. No.: 11/644,013

(22) Filed: Dec. 21, 2006

Related U.S. Patent Documents

Reissue of:
(64) Patent No.: 6,834,048
Issued: Dec. 21, 2004
Appl. No.: 09/668,427
Filed: Sep. 22, 2000

(51) Int. Cl.
*H04L 12/66* (2006.01)

(52) U.S. Cl. ..... 370/356; 370/465; 370/401
(58) Field of Classification Search ..... 370/352–356, 370/401, 465–466
See application file for complete search history.

(56) References Cited

U.S. PATENT DOCUMENTS 6,026,087 A 2/2000 Mirashrafi et al.
6,266,539 B1 * 7/2001 Pardo ..... 455/556.2
6,341,128 B1 1/2002 Svedberg et al.
6,567,848 B1 5/2003 Kusuda et al.
6,570,870 B1 5/2003 Berstis
6,585,776 B1 7/2003 Bates et al.
6,625,139 B2 * 9/2003 Miloslavsky et al. ..... 370/352
6,628,644 B1 * 9/2003 Nelson et al. ..... 370/352
6,674,453 B1 1/2004 Schilit et al.
6,870,828 B1 * 3/2005 Giordano, III ..... 370/352
2002/0164000 A1 11/2002 Cohen et al.

OTHER PUBLICATIONS

"Answers on the fly!" Copyright © 2000 Flyswatt, Inc. http://www.flyswat.com/.
"Script–based security ", © by Wroc Press. © Microsoft Corporation, http://mmsdn.microsoft.com/library/partbook/instanti/scriptbasedsecurity.htm.
David Stearns, "The Basics of Programming Model Design", Microsoft Corporation, Jun. 1998, http://msdn.microsoft.com/library/techart/msdn_basicomd.htm.
Doni Esposito, "Browser Helper Objects: The Browser the Way You Want It", Microsoft Corporation; Jan. 1999, http://msdn.microsoft.com/library/techart/bho.htm.

* cited by examiner

*Primary Examiner*—Thai D Hoang
(74) *Attorney, Agent, or Firm*—Darby & Darby P.C.; Jamie L. Wiegand

(57) ABSTRACT

A direct telephone dialing scheme for initiating internet telephone service from a web page is provided. The scheme allows a caller, using an internet telephone service, to place telephone call to a telephone number appearing on any web page directly from that web page. In one embodiment, a caller navigates to a desired web page on the internet and the caller dials a telephone number on that web page directly to initiate a two-way audio communication with the destination telephone number using an internet telephone service. The direct telephone dialing scheme of the present invention improves the accessibility and ease of use of internet telephone services. Furthermore, the direct telephone dialing scheme can be used with video, data, and fax a communications which are supported by the VoIP data communication standard.

4 Claims, 5 Drawing Sheets

METHOD FOR INITIATING INTERNET TELEPHONE SERVICE FROM A WEB PAGE

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a reissue application of U.S. Pat. No. 6,834,048, which issued on Dec. 21, 2004, claiming benefit therefrom and which is further incorporated by reference. Notice: More than one reissue application has been filed for the reissue of U.S. Pat. No. 6,834,048. The reissue applications are U.S. application Ser. Nos. 11/644,013 (the present application), 12/367,349 (which is a continuation reissue patent application), and 12/367,235 (which is a divisional reissue patent application).*

REFERENCE TO APPENDICES

Appendix A, which is an integral part of the present disclosure, includes a computer program listing of components of the Microsoft Visual C++ project used to create a dynamically linked library (DLL) named IEHooker.DLL for implementing the direct telephone dialing scheme according to one embodiment of the present invention.

Appendix B, which is an integral part of the present disclosure, shows modifications to the Microsoft Windows registry for implementing the direct telephone dialing scheme according to one embodiment of the present invention.

Appendices A and B contain copyrighted material. The copyright owner, Dialpad.com,, Inc. has no objection to the facsimile reproduction by anyone of the patent documents or patent disclosure, as it appears in the Patent and Trademark Office patent files or records, but otherwise reserves all copyrights whatsoever.

BACKGROUND OF THE INVENTION

1. Field of the Invention

The present invention generally relates to voice communications; and in particular, the present invention relates to a method for initiating internet telephone service from a web page.

2. Background of the Invention

Voice over internet protocol (VoIP) technology has spawned made available internet telephone services. An internet telephone service allows a caller to place a telephone call from his/her personal computer (PC) through the internet to another audio communication device, such as a wired or wireless telephone. VoIP technology is based on the ITU-T H.323, standard and supports audio, video, data, or fax communications using the internet protocol (IP) on the public internet and within private intranets.

Internet telephone service can take many forms. Typically, a caller accesses an internet telephone service provider's web site which provides an interface to the internet telephone service. The caller enters then the telephone number he wishes to dial. The telephone service "dials" the telephone number and "rings" the destination communication device (e.g. a telephone).

However, improvements over the existing internet telephone services are desired. In particular, it is desirable to provide features to make internet telephone services more convenient and accessible.

SUMMARY OF THE INVENTION

In accordance with an embodiment of the present invention, a method for initiating an internet telephone service from a web page containing at least one telephone number comprises: (a) accessing the web page using a browser; (b) downloading a web page document associated with the web page; (c) parsing the web page document for detecting a character string indicative of a telephone number; (d) modifying the character string in the web page document into a link to the internet telephone service: (e) providing the web page document including the modified character string to the browser; and (f) displaying the web page on the browser including the telephone number.

According to another embodiment of the present invention, the method further comprises: (g) selecting the character string indicative of the telephone number; (h) activating the link to the internet telephone service; (i) passing the telephone number to the internet telephone service; (j) launching a server side script at the internet telephone service for initiating a telephone call to the telephone number; and (k) establishing two-way communications between a caller selecting the character string and a destination audio device designated by the telephone number.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In accordance with the present invention, a direct telephone dialing scheme for internet telephony is provided to allow a caller, using an internet telephone service, to place a telephone call to a telephone number appearing on any web page directly from that web page. In one embodiment, a caller navigates on the internet to a desired web page and then clicks on a telephone number appearing on the web page to initiate a telephone call using an internet telephone service. Contrary to a conventional telephone service initialization process, the caller may place a telephone call without the need to navigate to the internet telephone service provider's web site and enter or type in the desired telephone number on the service provider's web site. The direct telephone dialing scheme of the present invention greatly improves the accessibility and ease of use of internet telephone services and provides convenience not realized by conventional internet telephone services.

Figure 1A:
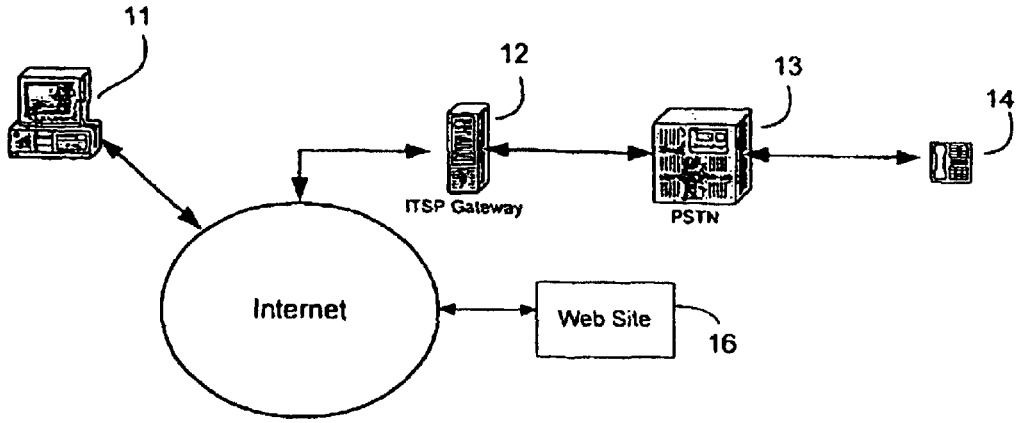
FIG. 1A illustrates one embodiment of a communication system for providing audio communication between a personal computer and an audio communication device.

A direct telephone dialing scheme of the present invention can be used with an internet telephone service, such as those provided by Dialpad.com, Phonefree.com, and Net2phone. In one embodiment, the internet telephone service is based on the communication system described in co-pending and commonly assigned U.S. patent application Ser. No. 09/401,898, entitled "Scaleable Communications System," of Wongyu Cho et al., filed Sep. 24, 1999, which is incorporated herein by reference in its entirety FIG. 1A illustrates one embodiment of the communication system of the aforementioned patent application by Cho et al. which provides audio communication between a personal computer 11 and an audio communication device 14. In operation, a local caller using computer 11, equipped with a sound card and headset, for example, uses a web browser to access and log onto web site 16 of an internet telephone service provider. After logging-on, the local caller provides the phone number of regular telephone 14 to web site 16, which then directs an Internet Telephone Service Provider (ITSP) gateway 12 to provide a voice communication between computer 11 and telephone 14. ITSP gateways are available from several network service providers including the IDT Corporation and Qwest Communications. ITSP gateway 12 is coupled to a remote caller who, in this example, uses telephone 14 linked to a public switched telephone network (PSTN) 13. PSTN provides either wired or wireless telephone service commonly known as "plain old telephone service" (POTS).

Figure 1B:
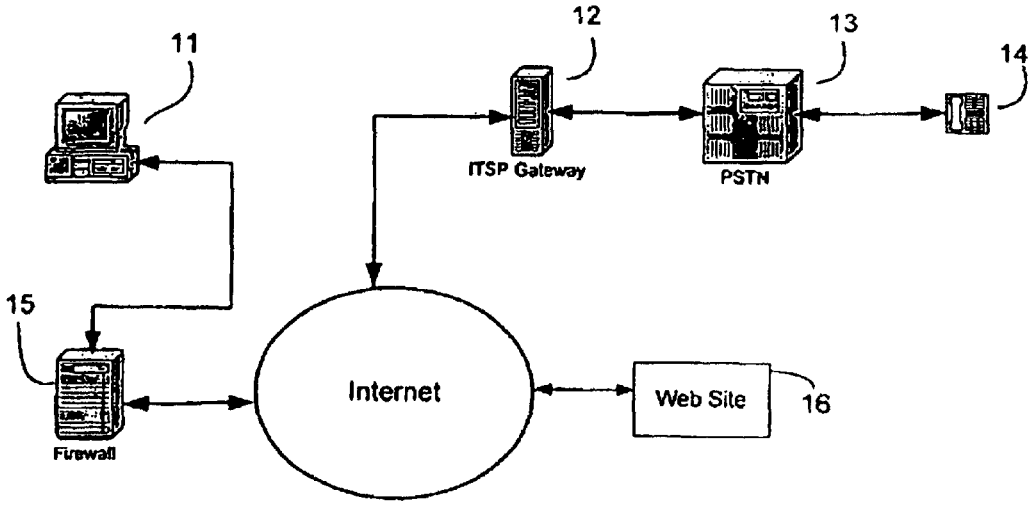
FIG. 1B illustrates another embodiment of a communication system for providing audio communication between a personal computer and an audio communication device where the personal computer is located behind a firewall.

ITSP gateway 12 converts the voice data from computer into corresponding voice signals for transmission to telephone 14 through PSTN 13. Conversely, ITSP gateway converts voice signals received from telephone 14 into a form that is suitable for transmission over the internet to computer 11. The direct-dial internet telephone service initiation scheme of the present invention can also be used with a network in which computer 11 is located behind a firewall 15 as illustrated in FIG. 1B. A method for exchanging data with computers within a secure network is described in copending and commonly assigned U.S. patent application Ser. No. 09/627,723 "Data Exchange With Computers Within A Secure Network", by Wongyu Cho and Hyungkeun Hong, incorporated herein by reference in its entirety.

To use an internet telephone service to place a telephone call, a caller uses a personal computer (such as PC 11 in FIG. 1A) to access the internet or a private network. The personal computer is equipped with a web browser such as Microsoft Internet Explorer™ or Netscape Navigator™ for accessing a web page with graphical content. To specify a web site, the caller enters a uniform resource locator (URL) specifying both the server and the specific data ("web page") requested. The URL may specify a hypertext transfer protocol (HTTP) or another transfer protocol for communicating between the server and the browser. In conventional internet telephone service, the caller accesses the web site of an internet telephone service provider and enters the telephone number of the destination communication device on a "console" (e.g., a graphical caller interface) of the provider's web site. The internet telephone service provider then dials the telephone number. However, in many instances, the caller may navigate to a web page containing telephone numbers which the caller wishes to dial. For example, the caller may navigate to the web page of a local restaurant which includes the telephone number of the restaurant. To place a telephone call to the restaurant using internet telephony, such as to make a dinner reservation, the caller has to record the telephone number in some manner and go to the web site of his desired internet telephone service provider by specifying the provider's URL. The caller then enters the recorded telephone number into the console at the web site of the telephone service provider for dialing the telephone number. This telephone dialing process is very cumbersome, particularly when the caller is viewing a page containing several telephone numbers which he wishes to dial in sequence, such as when the caller is viewing a yellow page listing of restaurants in the local area.

The direct telephone dialing scheme of the present invention facilitates convenient internet telephone service by integrating internet telephone services with telephone numbers appearing on any web pages. A caller may dial a telephone number appearing on any web page directly from that web page. In one embodiment, the caller dials the telephone number by placing the cursor on the telephone number and selecting the telephone number (such as by clicking on the number). The caller does not have to leave the web page he is currently viewing and can thus conveniently dial one or more of the telephone numbers appearing on the web page.

According to one embodiment of the present invention, the direct telephone dialing scheme for internet telephony is embodied in a software program operating as a browser level application. The software program, called the Direct Dial software program, is installed in the caller's computer and works cooperatively with the browser application to provide the caller with a more convenient access to internet telephone services. The operation of the direct telephone dialing scheme with a browser application is explained with reference to the flowcharts in FIGS. 2 and 3.

Figure 2:
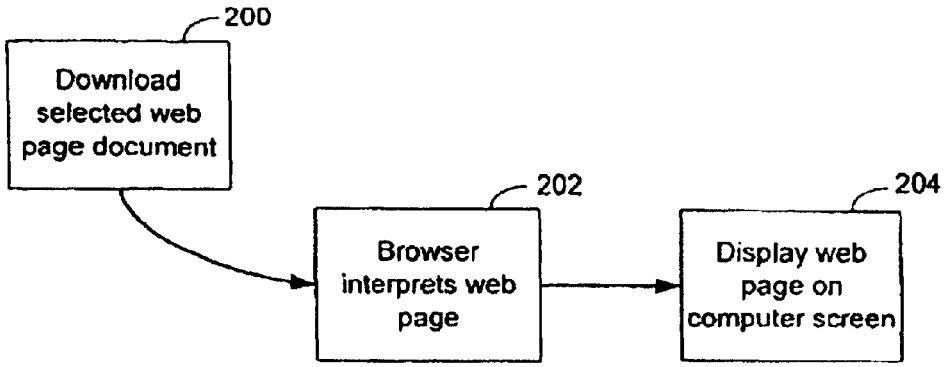
FIG. 2 (Prior Art)
FIG. 2 illustrates the conventional operation of a browser for downloading and displaying a web page document.
Figure 3:
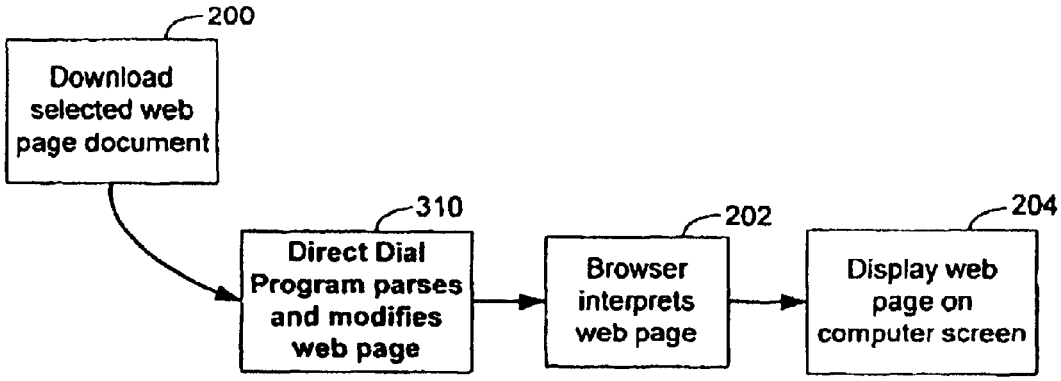
FIG. 3 illustrates the operation of a browser together with the direct telephone dialing scheme of the present invention.

Referring to FIG. 2, when a caller navigates to a new web page identified by a new URL, the browser performs three basic functions. First, the browser downloads the selected web page document (step 200). Typically, the web page document is written using HTML (hypertext markup language). Then, the browser interprets the web page document and prepares the host environment for the document (step 202). Finally, the browser renders the web page on the caller's computer display (step 204). When the direct telephone dialing scheme for internet telephony of the present invention is installed into the caller's computer, the browser operates according to the flowchart in FIG. 3. The direct telephone dialing scheme operates to intercept a web page document downloaded by the browser, and parses and modifies the web page as needed (step 310) before the web page is interpreted by the browser (step 202). Specifically, the direct telephone dialing scheme operates to parse the web page document, detect for text strings matching the criteria of telephone numbers, and modify the text string into a link to an internet telephone service provider so that the caller may activate the internet telephone service upon selecting or clicking on the modified text string. After the direct dial software program operates on the web page, the web page document with the modified text string is returned to the browser, interpreted (step 202), and then rendered on the computer display of the caller's computer (step 204).

Figure 4:
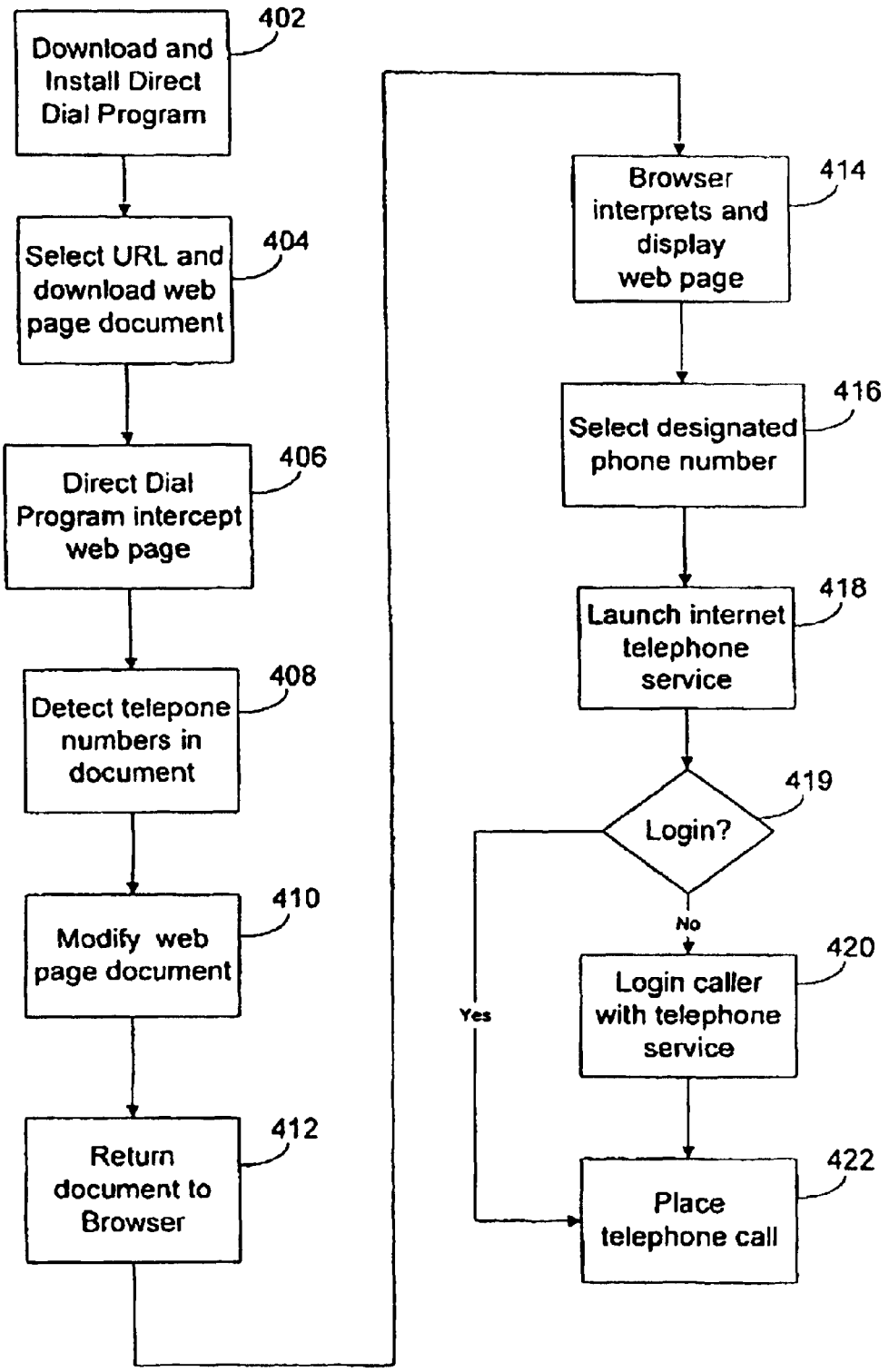
FIG. 4 is a flow diagram illustrating the detailed operation of the direct telephone dialing scheme for internet telephony according to one embodiment of the present invention.

FIG. 4 is a flow diagram illustrating the detailed operation of the direct telephone dialing scheme for internet telephony according to one embodiment of the present invention. First, a caller installs the Direct Dial software program that embodies the direct telephone dialing scheme of the present invention (step 402). For instance, the caller can copy the Direct Dial software program to his host computer and install the software program on the computer as is conventionally done. In one implementation, the Direct Dial software program is provided in a dynamically linked library (DLL) file and after the caller copies the DLL file to his host computer, the caller installs the DLL file by registering the file with the Microsoft Windows™ operating system using the "REGSVR32.exe" file. When the Direct Dial software program is installed onto the caller's computer, the program is loaded whenever the browser application is activated.

After the caller installs the Direct Dial software program, the caller can then invoke the browser application and access the internet, selecting web sites she wishes to view. To access a particular web page, the caller specifies the URL of the desired web page and the browser downloads the web page document associated with the URL (step 404). Before the web page is interpreted by the browser for display on the computer screen, the direct telephone dialing program of the present invention intercepts the web page (step 406). The direct telephone dialing scheme of the present invention operates to parse the web page document and detect text strings which constitute telephone numbers appearing in the document (step 408). In one embodiment, the direct telephone dialing scheme examines the character strings in the document and identifies character strings having the following formats as constituting telephone numbers:

(###)###-####,
(###) ###-####,
.###.####,
/###/####,
/###-####,
-###-####,
(###-###-####),
#-###-###-####,
+# (###) ###-####,
+# (###)###-####,
+# ### ### ####,
+#-### ### ####,
+#-### ###-###,
+#-###-###-####,
### ####,
###.####,
###-####, and
####, where # represents an alphanumeric character from 0 to 9 and from A to Z. Note that the direct telephone dialing scheme recognizes a character string with the format "##########" as a telephone number only when the first three characters are numeric characters from 0 to 9. In the present embodiment, the direct telephone dialing scheme recognizes any 10-digit alphanumeric string or any 11-digit alphanumeric string as telephone numbers. Furthermore, the alphanumeric strings may use any form of character separations including but not limited to: ".", "/", "-", "+", "(", and ")". Thus, the formats given above can be used to recognize United States telephone numbers in any format. The use of alphanumeric characters in the present embodiment allows the recognition of telephone numbers which are spelled in alphabetical characters, such as 1-800-ASK-USPS used by the United States Postal Service. In the present embodiment, the recognized telephone numbers always include the area code, even for local calling. However, the 1 prefix is optional. The advantage of only recognizing telephone numbers including the area code is to ensure that the telephone call is placed to the correct recipient. Since the internet allows the caller to access web pages without geographic limits, a caller often accesses web pages outside of his local telephone dialing areas. By recognizing only telephone numbers including the area code, the direct telephone dialing scheme of the present invention ensures that any telephone call placed will be to the correct recipient. Of course, the area code requirement is optional and the direct telephone dialing scheme can be made to work with telephone numbers not including area codes.

Of course, the direct telephone dialing scheme of the present invention can also operate with international telephone numbers for dialing a telephone number outside of the country the caller is in. Additional telephone number templates can be added to the direct telephone dialing scheme for recognizing international telephone numbers. For example, a typical Korean telephone number has the format: 82-2-2000-1000. If it is important to recognize Korean telephone numbers, a telephone number template such as: ##-#-####-#### can be used. Furthermore, the direct telephone dialing scheme of the present invention can also append the necessary international dialing access code to the international telephone number to facilitate international calling using an internet telephone service. Thus, if the caller is in the United States, the direct telephone dialing scheme can append the code "011" to the beginning of an international telephone number so that an internet telephone service can place the telephone call directly to the oversea recipient.

Figure 5A:
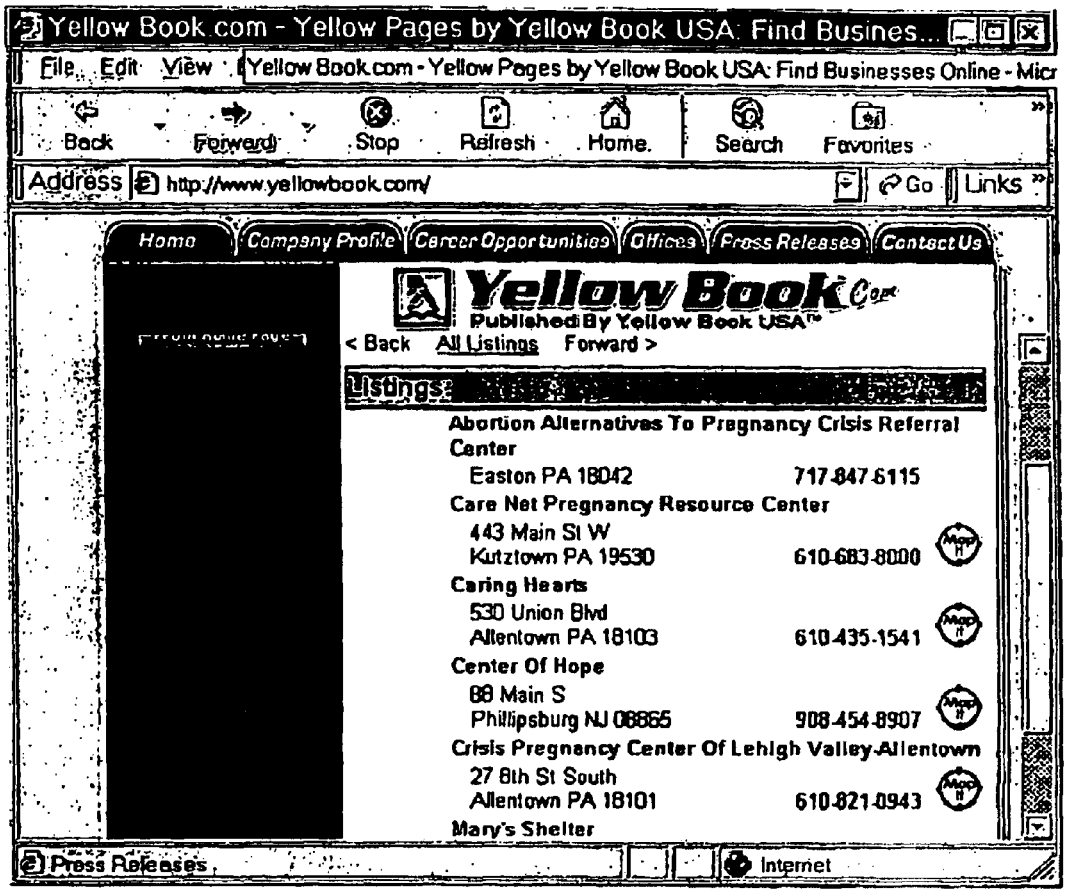
FIG. 5A illustrates an exemplary web page containing telephone numbers displayed by Microsoft Internet Explorer™.
Figure 5B:
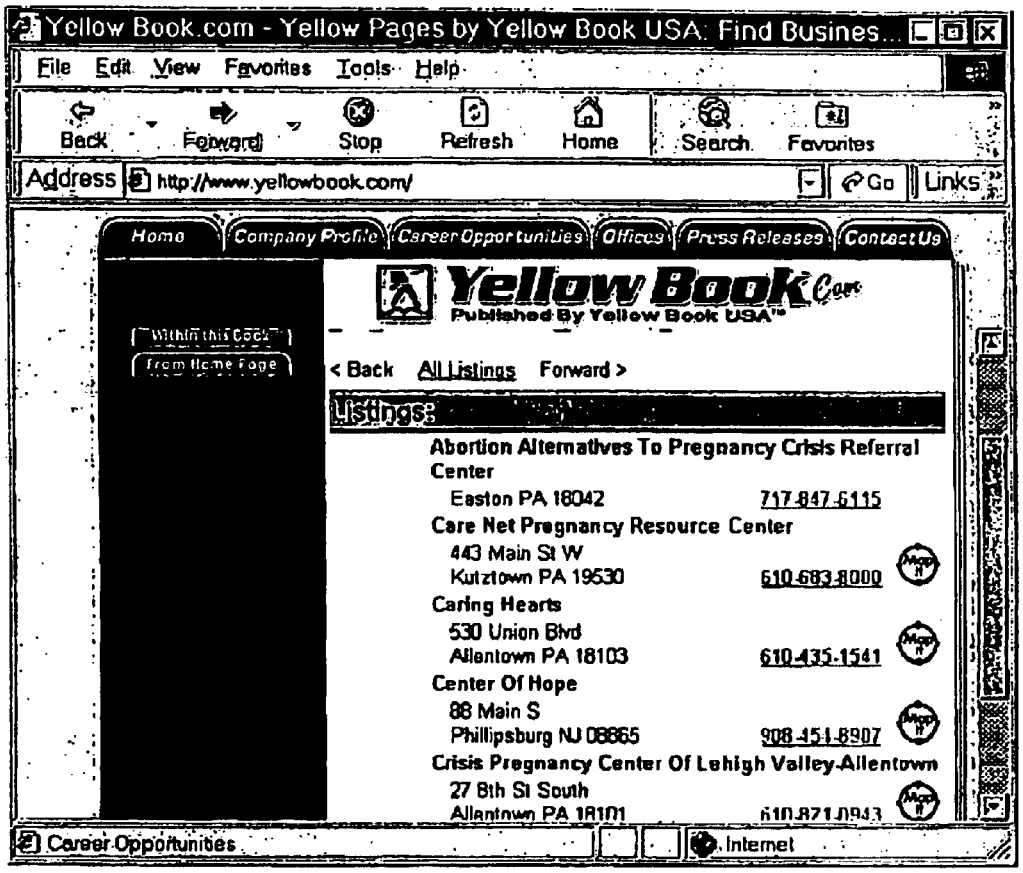
FIG. 5B illustrates the web page of FIG. 5A displayed by Microsoft Internet Explorer™ after the operation of the direct telephone dialing scheme of the present invention.

After the direct telephone dialing scheme identifies certain character strings in the web page document as telephone numbers, the telephone dialing scheme proceeds to modify the identified character strings (step 410). Specifically, the character strings are modified to include a link to an internet telephone service provider. In one embodiment, the appearance of character strings is also modified. For example, the character strings can be underlined, highlighted, or bolded. By modifying the appearance of the character strings, the direct telephone dialing scheme of the present invention identifies to the caller the character strings on the web page which have been designated as telephone numbers and are thus available for direct telephone service initiation. After the direct telephone dialing scheme operates on the web page document, the document is returned to the browser (step 412). The browser interprets the modified web page, and displays the modified web page on the caller's computer screen (step 414). FIG. 5A illustrates an exemplary web page without being modified by the direct telephone dialing scheme of the present invention. In FIG. 5A, a telephone listing of pregnancy centers provided by YellowBook.com™ is shown. FIG. 5B illustrates the same web page after the operation of the direct telephone dialing scheme of the present invention. The character strings in the web page that have been underlined have been designated as telephone numbers and can be used to activate internet telephone service.

To place a telephone call to a telephone number designated by the direct telephone dialing scheme, the caller selects the designated telephone numbers by clicking on the underlined or hi-lighted text (step 416). Because the designated telephone number is a link to an internet telephone service provider, selection of the telephone number launches the internet telephone service (step 418). The internet telephone service proceeds in accordance with the communication protocol of the service provider. In one instance, the service provider requires the caller to login to the service provider's network. Thus, the service provider determines whether or not the caller has already logged into the network (step 419). If the caller has not logged in, then the service provider prompts the call for login information (step 420). After the caller logs into the provider's network, the internet telephone service provider places the telephone call to the designated telephone number (step 422). As mentioned above, any number of internet telephony technology can be used to place the telephone call and accomplish voice communication between the caller and the designated audio communication device. The services provided by Dialpad.com are one exemplary internet telephone service.

According to another embodiment of the present invention, the telephone number detection step 408 of the direct telephone dialing scheme further detects whether the character string identified as a telephone number is itself a hypertext link. If the character string is itself a hypertext link, then the direct telephone dialing scheme will not designate the character string as a telephone number and modification step 410 will not modify the character string into a link to an internet telephone service provider. In this manner, the direct telephone dialing scheme avoids writing over existing links in the web page and preserves the integrity of the web page document. In one embodiment, when the web page is written in HTML format, the direct telephone dialing scheme determines if a character string is a hypertext link by detecting for the anchor element A or a preceding the character string which is used to denote the character string as a hypertext link.

According to yet another embodiment of the present invention, the direct telephone dialing scheme provides a caller interface to allow the caller to enable or disable the direct telephone dialing function. When disabled, the browser operates according to the flow chart illustrated in FIG. 2.

An implementation of the direct telephone dialing scheme of the present invention is now described using Microsoft Internet Explorer™ as an example. Of course, persons of ordinary skill in the art can adapt the present teachings to work with other types of web browsers. Appendix A includes a computer program listing of components of the Microsoft Visual C++IL: project used to create a dynamically linked library (DLL) named IEHooker.DLL which implements the direct telephone dialing scheme according to one embodiment of the present invention. The files contained in the computer program listing detail the customization for implementing the direct telephone dialing scheme in Internet Explorer. When a caller installs IEHooker.DLL onto its computer, the objects in the DLL becomes registered with the Windows Registry and will be available for use by Internet Explorer. In the present implementation, the direct telephone dialing scheme is applied to the internet telephone service provided by Dialpad.com and the direct telephone dialing scheme is called "Dialpad Everywhere." Appendices A and B are not necessary to the understanding of the invention, but are provided merely as additional examples.

In the present embodiment, the direct telephone dialing scheme is implemented as a Browser Helper Object (BHO) of Internet Explorer. Browser Helper Objects are in-process Component Object Model (COM) components and can be applied to allow one to customize Internet Explorer to create a specialized version of the browser. For a detailed description of Browser Helper Objects, see Browser Helper Objects: The Browser the Way You Want it by Dino Esposito, January 1999, available at the following web site: http://msdn.microsoft.com/library/techart/bho.htm. The article is incorporated herein by reference in its entirety. In brief, BHOs are component objects which Internet Explorer loads each time the application is started. A BHO can be used to detect the browser's typical events or install hooks to monitor messages and actions in Internet Explorer.

A BHO, as a COM in-process server, is registered under a certain registry's key so that Internet Explorer can look up and load the browser help object during startup. The CIEHooker.rgs file in Appendix A is a registration script file used to create registry entries for implementing the direct telephone dialing scheme upon installation of the CIEHooker.DLL file. The following Microsoft Windows registry folders are created in one example:

HKEY_LOCAL_MACHINE/SOFTWARE/Microsoft/Windows/CurrentVersion/Explorer/'Browser Helper Objects'/{1 6 1 2 2 F 0 2 - 9 7 1 3 - 1 1 D 3 - 9 7 4 4 - 005004116944}

HKEY_CLASSES_ROOT/IEHooker.CIEHooker.1

HKEY_CLASSES_ROOT/IEHooker.CIEHooker.1/CLSID

HKEY_CLASSES_ROOT/IEHooker.CIEHooker

HKEY_CLASSES_ROOT/IEHooker.CIEHooker/CLSID

HKEY_CLASSES_ROOT/IEHooker.CIEHooker/CurVer

Example modifications to the Windows registry for implementing the direct telephone dialing scheme of the present invention in Internet Explorer is also shown in Appendix B. In the present embodiment, a registry is also created to query the caller to set and determine the operation status of the direct telephone dialing feature. In operation, the registry provides a caller interface where the caller may enable or disable the direct telephone dialing feature.

The file CIEHooker.cpp in Appendix A is a source a file containing the overrides needed to hook the direct telephone dialing feature into Internet Explorer as a browser helper object. The direct telephone dialing BHO executes custom codes when certain events from the browser take place. Here, the custom codes are executed during the events DISPID _DOCUMENTCOMPLETE and DISPID_ONQUIT. CIEHooker.h is a header file for CIEHooker.cpp.

In the present embodiment, the custom codes for the direct telephone dialing feature are CheckNum.h (the header file) and CheckNum.cpp which is a source file containing a program segment for parsing the text in the document for telephone numbers and modifying the telephone numbers into links to an internet telephone service provider. In the present implementation, the links are hyperlinks as will be described in more detail below.

In operation, when Internet Explorer completes downloading of a web page document, typically written in RTML (step 404 in FIG. 4), the program segment embodiment in the CheckNum.cpp code is executed to detect and modify text strings which constitute as telephone numbers (steps 408 and 410 of FIG. 4). In CheckNum.cpp, the telephone number formats described above are used to detect the presence of telephone numbers in the character strings of the web page document. After a telephone number is detected, the program of CheckNum.cpp inserts three link strings to the telephone number to convert the telephone number to a hyerplink. For example, the original character string in the web page document may appear as follows (note that the telephone number string is denoted by the argument phonenumber):

<Foot>phonenumber</Font>

In the present implementation the direct telephone dialing scheme inserts three link strings into the character string above as follows:

[Link String1]phonenumber[Link String2]phonenumber [Link String3].

The three link strings are defined as follows:

Link String]

<FONT CLASS='PHONE' STYLE='CURSOR= HAND;'

COLOR='#0000FF'

OnMouseOut=window.event.srcElement.style.color= '#0000FF'

OnMouseOver=window.event.srcElement.style.color= '#FF0000'

OnClick=window.open('http://www.dialpad.com/cgi-bin/launch.pl?Number=

Link String2

','Dialpad','scrollbars=no,resizable=no,width=420, height=370)><U>

Link String3

</U></Font>

In the present example, Link String1 contains commands for controlling the rendering and style of the mouse on the caller's host computer, such as the "OnMouseOut" and "OnMouseOver" commands. These commands are of course optional. The "OnClick command" in Link String1 modifies the character string into a link for launching a server side script of an internet telephone service provider. Here, the internet telephone service provider is Dialpad.com. When the OnClick command is executed, the phonenumber parameter appended to the end of Link String1 is passed with the link to the server side script of the internet telephone service provider (i.e., Dialpad.com). The server side script is linked to an applet for activating the internet telephone service at the provider's server. When the applet is launched, the service provider dials the telephone number received via the phonenumber parameter. Here, the server side script launches the Dialpad applet for initiating voice communication over the internet using the network described in aforementioned patent application Ser. No. 09/401,898, entitled Scaleable Communications System, of Wongyu Cho et al.

When the OnClick command is executed, the service provider may provide a window on the computer display identifying the telephone service provider and the status of the telephone call. Link String2 contains standard window sizing parameters and properties for defining the display widow of the telephone service provider. In the present example, Link String2 is used for the Dialpad.com telephone service. Link String2 or similar command strings may be optional for other telephone service providers. At the end of Link String2, the phonenumber parameter is again inserted for providing to the computer display the character string which has been identified as a telephone number. In the present implementation, the character string is being underlined by the action of Link String3. Of course, other formatting functions can be used. After the execution of the program CheckNum.cpp, the web page is returned to Internet Explorer for display.

In the present embodiment, CheckNum.cpp includes a routine for excluding modification of character strings which are already a hypertext link. In HTML, an anchor element, A or a, is used to denote a text string as a hypertext link. CheckNum.cpp checks for the presence of the anchor element A and if a character string is preceded by <A> or <a, the string is skipped to avoid modifying any existing hypertext link in the web page document.

The direct telephone dialing scheme can also be implemented in Netscape navigator. The Direct Dial software program can be written as a Java script. Then, the Java script is installed and activated using Script Signing. A description of Script Signing can be found at the web site: http://msdn.microsoft.com/library/partbook/instantj/scriptbasedsecurity.htm.

The direct telephone dialing scheme for internet telephony has many advantages. First, a caller can dial telephone numbers from any web pages and do not need to switch to an internet service provider's web site to access the internet telephone service. This is particularly useful when the caller is using internet yellow pages to generate a list of telephone numbers to call. Second, the caller can dial any of the telephone numbers identified by the scheme without the need to record the telephone number and type in the number onto a console of the service provider. Third, the caller does not have to leave the web site from which he makes the call and thus can inquire about information on the web site while communicating with the destination telephone number.

The above detailed descriptions are provided to illustrate specific embodiments of the present invention and are not intended to be limiting. Numerous modifications and variations within the scope of the present invention are possible. The present invention is defined by the appended claims.

APPENDIX A

```
Filename: IEHooker.idl
// IEHooker.idl : IDL sources for IEHooker.dil
//
// This file will be processed by the MIDL tool to
// produce the type library (IEHooker.tlb) and marshalling code.
import "oaidl.idl";
import "ocidl.idl";
    [
        object,
        uuid(16122F01-9713-11D3-9744-005004116944),
        dual,
        helpstring("ICIEHooker Interface"),
        pointer_default(unique)
    ]
    interface ICIEHooker : IDispatch
    {
    };
[
    uuid(16122EF1-9713-11D3-9744-005004116944),
    version(1.0),
    helpstring("IEHooker 1.0 Type Library")
]
```

APPENDIX A-continued

```
library IEHOOKERLib
{
    importlib("stdole32.tlb");
    importlib("stdole2.tlb");
    [
        uuid(16122F03-9713-11D3-9744-005004116944),
        helpstring("_ICIEHookerEvents Interface"),
    dispinterface _ICIEHookerEvents
    {
        properties:
        methods:
        [id(1), helpstring("method MakeCall")] HRESULT MakeCall(BSTR bstr);
    };
    [
        uuid(16122F02-9713-11D3-9744-005004116944),
        helpstring("CIEHooker Class")
    ]
    coclass CIEHooker
    {
        [default] interface ICIEHooker;
        [default] dispinterface _ICIEHookerEvents;
    };
};
Filename: checkNum.h
#ifndef CHECK_NUM_H
#define        CHECK_NUM_H
#include "mshtml.h"
#define DO_IDLE                    0
#define DO_START                   1
#define DO_CONTINUE                2
#define DO_SUCCESSEND              3
#define DO_FAILEND                 4
typedef struct DATA_tag
{
    char* input_buf;
    int input_size;
    char* output_buf;
    int output_size;
    int iCheckStatus;
    BOOL bUserStop;
    struct DATA_tag* pNext;
    IHTMLDocument2* pDocument;
}STRUCT_PROCESS;
void checkPhoneNumThread(void *pVoid);
void checkPhoneNumProc(STRUCT_PROCESS *pData);
BOOL checkPhoneNum(STRUCT_PROCESS *pData);
#endif
Filename: checkNum.cpp
#include "stdafx.h"
#include "checkNum.h"
#define MIN_PHONENUM_COUNT 10
static char* szNumMapTable[ ] = {
    "(###)###-####",
    "(###) ###-####",
    "###.###.####",
    "###/###/####",
    "###/###-####",
    "###-###-####",
    "(###-###-####)",
    "#-###-###-####",
    "+# (###) ###-####",
    "+# (###)###-####",
    "+# ### ### ####",
    "+#-### ### ####",
    "+#-### ###-####",
    "+#-###-###-####",
    "### ### ####",
    "### ###.####",
    "### ###-####",
    "##########"
};
static const MAX_MAP_COUNT = sizeof( szNumMapTable )/sizeof( szNumMapTable[0]);
static char szInsertString1[ ] = {
    "<Font CLASS='PHONE' STYLE='CURSOR=HAND;' COLOR='#66CC00'
OnMouseOut=window.event.srcElement.style.color='#66CC00'
OnMouseOver=window.event.srcElement.style.color='#FF0000'
OnClick=window.open('http://www.dialpad.com/dialpad/launch.php3?Number="//cgi-bin/launch.pl?Number="
};
static char szInsertString2[ ] = {
```

APPENDIX A-continued

```
    "','Dialpad','scrollbars=no,resizable=no,width=420,height=370')><U>"
};
static char szInsertString3[ ] = {
    "</U></Font>"
};
static const int nInsertLen = strlen(szInsertString1) + strlen(szInsertString2) + strlen(szInsertString3);
BOOL IsValidNum(char* phoneNum)
{
    char num[MAX_PATH];
    strcpy(num,phoneNum);
    int nDigitCount = 0;            // track digits because since we also consider letters
                                        // in addition to numbers we need to make sure that here
                                        // is at least three digits (for area code)
    if(strlen(phoneNum) >= MIN_PHONENUM_COUNT)
    {
        for(int i = 0; i < (int) strlen(num) ; i++)
        {
            if( (num[i] >= '0' && num[i] <= '9') )
            {
                nDigitCount++;
                num[i] = '#';
            }
            else if ( (num[i] >= 'A' && num[i] <= 'Z') )
            {
                num[i] = '#';
            }
        }
        for(i = (int)strlen(num) - 1 ; i <= 0; i--)
        {
            if(num[i] == '#') break;
            if( num[i] == ' ' ) num[i] = NULL;
        }
        for(i = 0; i < MAX_MAP_COUNT ; i++)
        {
            if( (strcmp(szNumMapTable[i],num) == 0)
                && nDigitCount >= 3 )
            {
                return TRUE;
            }
        }
    }
    return FALSE;
}
BOOL isLinkTag( char* strTag)
{
    if(strcmp(strTag,"a") == 0 || strcmp(strTag,"A") == 0)
        return TRUE;
    return FALSE;
}
BOOL isLinkEndTag( char* strTag)
{
    if(strcmp(strTag,"a") == 0 || strcmp(strTag,"A") == 0)
        return TRUE;
    return FALSE;
}
BOOL checkPhoneNum(STRUCT_PROCESS *pData)
{
    char *copyText;
    char ch;
    BOOL bRtn           = FALSE;
    BOOL bSkip          = FALSE;
    BOOL bNum           = FALSE;
    BOOL bLinkTag       = FALSE;
    BOOL bTag           = FALSE;
    int checkSpace = nInsertLen * 10;//strlen(szInsertString1) * 10;
    char phoneNum[MAX_PATH];
    char dummyPhoneNum[MAX_PATH];
    char strTAG[MAX_PATH];
    if(pData-->iCheckStatus != DO_START) return FALSE;
    copyText = new char[pData-->input_size + checkSpace];
    pData-->output_buf = new char[pData-->input_size + checkSpace];
    int insize = pData-->output_size = pData-->input_size;
    memset(phoneNum,NULL,MAX_PATH);
    memset(dummyPhoneNum,NULL,MAX_PATH);
    memset(copyText,NULL,insize);
    memset(strTag,NULL,MAX_PATH);
    int j = 0;
    int k = 0;
    int l = 0;
```

APPENDIX A-continued

```
int m = 0;
pData-->iCheckStatus = DO_CONTINUE;
for(int i = 0; i < insize ; i++) {
    if(pData-->bUserStop) {
        bRtn = FALSE;
        break;
    }
    ch = pData-->input_buf[i];
    if ( ( ch >= '0' && ch <= '9')
        || ( ch >= 'A' && ch <= 'Z' && TRUE == bNum ) )
    {
        if( bSkip == FALSE ) {
            phoneNum[j++] = ch;
            dummyPhoneNum[l++] = ch;
            bNum = TRUE;
        }else {
            copyText[k++] = ch;
        }
    }
    else
    {
        switch(ch) {
        case '.':
            if( bSkip == FALSE ) {
                if(bNum && (l == 3 || l == 7)) {
                    dummyPhoneNum[i++] = ch;
                }
                // the '.' might be a sentence terminator
                else if (bNum && (l == 8 || l == 12 || l == 14))
                {
                    goto check_routine:
                }
                else {
                    for(int i = 0; i < (int)strlen(dummyPhoneNum) ; i++) {
                        copyText[k++] = dummyPhoneNum[i];
                    }
                    copyText[k++] = ch;
                    bNum = FALSE;
                    memset(dummyPhoneNum,NULL,MAX_PATH);
                    memset(phoneNum,NULL,MAX_PATH);
                    j = 0;
                    l = 0;
                }
            } else {
                copyText[k++] = ch;
            }
            break;
        case '/':
            if( bSkip == FALSE ) {
                if(bNum && (l == 3 || l == 7)) {
                    dummyPhoneNum[l++] = ch;
                } else {
                    for(int i = 0; i < (int)strlen(dummyPhoneNum) ; i++) {
                        copyText[k++] = dummyPhoneNum[i];
                    }
                    copyText[k++] = ch;
                    bNum = FALSE;
                    memset(dummyPhoneNum,NULL,MAX_PATH);
                    memset(phoneNum,NULL,MAX_PATH);
                    j = 0;
                    l = 0;
                }
            } else {
                copyText[k++] = ch;
            }
            break;
        case ')':
            if( bSkip == FALSE ) {
                if(bNum) {
                    if(l == 4 || l == 13)
                        dummyPhoneNum[l++] = ch;
                    else
                        goto check_routine;
                } else {
                    for(int i = 0; i < (int)strlen(dummyPhoneNum) ; i++) {
                        copyText[k++] = dummyPhoneNum[i];
                    }
                    copyText[k++] = ch;
                    bNum = FALSE;
```

APPENDIX A-continued

```
                        memset(dummyPhoneNum,NULL,MAX_PATH);
                        memset(phoneNum,NULL,MAX_PATH);
                        j = 0;
                        l = 0;
                    }
                } else {
                    copyText[k++] = ch;
                }
                break;
            case '-':
                if( bSkip == FALSE ) {
                    if(bNum) {
                        dummyPhoneNum[l++] = ch;
                    else
                        copyText[k++] = ch;
                } else {
                    copyText[k++] = ch;
                }
                break;
            case ' ':
                if( bSkip == FALSE ) {
                    // check if ' ' is a terminator for the number
                    if (bNum && (1 > 10))
                    {
                        goto check_routine;
                    }
                    else if(bNum)
                        dummyPhoneNum[l++] = ch;
                    else
                        copyText[k++] = ch;
                } else {
                    copyText[k++] = ch;
                }
                break;
            case '(':
            case '+':
                if( bSkip == FALSE ) {
                    if((insize >= i + 1) &&
                        pData-->input_buf[1+1] >= '0' && pData-->onput_buf[i+1] <= '9') {
                        dummyPhoneNum[l++] = ch;
                        bNum = TRUE;
                    } else {
                        copyText[k++] = ch;
                    }
                } else {
                    copyText[k++] = ch;
                }
                break;
            case '>':
                if ( FALSE == bLinkTag )
                {
                    bSkip = FALSE;
                }
                bTag = FALSE;
                //if(bNum)
                // dummyPhoneNum[l++] = ch;
                //else - - - >why? 3/30/200
                copyText[k++] = ch;
                break;
            default:
check_routine:
                if( bSkip == FALSE ) {
                    if(bNum) {
                    if(    bLinkTag == TRUE) {
                        for(int i = 0; i < (int)strlen(dummyPhoneNum) ; i++) {
                            copyText[k++] = dummyPhoneNum[i];
                    }
                    memset(dummyPhoneNum,NULL,MAX_PATH);
                    l = 0;
                    copyText[k++] = ch;
                } else {
                    if(!IsValidNum(dummyPhoneNum)) {
                            for(int i = 0; i < (int)strlen(dummyPhoneNum) ; i++) {
                                copyText[k++] = dummyPhoneNum[i];
                            }
                            memset(dummyPhoneNum,NULL,MAX_PATH);
                            l = 0;
                            copyText[k++] = ch;
                        } else {
```

APPENDIX A-continued

```
                for(int i = 0; i < (int)strlen(dummyPhoneNum) ; i++) {
                    copyText[k++] = szInsertString1[i];
                }
                for(int i = 0; i < (int)strlen(dummyPhoneNum) ; i++) {
                    if(dummyPhoneNum[i] >= '0' && dummyPhoneNum[i] '= '9')
                        copyText[k++] = dummyPhoneNum[i];
                }
                for(i = 0; i < (int)strlen(szInsertString2) ; i++) {
                    copyText[k++] = szInsertString2[i];
                }
                for(i = 0; i < (int)strlen(dummyPhoneNum) ; i++) {
                    copyText[k++] = dummyPhoneNum[i];
                }
                memset(dummyPhoneNum,NULL,MAX_PATH);
                l = 0;
                for(i = 0; i < (int)strlen(szInsertString3) ; i++) {
                    copyText[k++] = szInsertString3[i];
                }
                copyText[k++] = ch;
                    bRtn = TRUE;
                }
            }
            memset(PhoneNum,NULL,MAX_PATH);
            bNum = FALSE;
            j = 0;
        }
        else
        {
            // bNum is false
            bLinkTag = FALSE;
            copyText[k++] = ch;
        }
        if(ch == '<') {
            memset(strTag,NULL,MAX_PATH);
            int idx = 1;
            while (1) {
                if((insize >= i + idx) &&
                    (pData-->input_buf[i + idx] == '>' || pData-->input_buf[i + idx] == ' '))
                {
                    if(isLinkTag(strTag))
                        bLinkTag = TRUE;
                    else if(isLinkEndTag(strTag))
                        bLinkTag = FALSE;
                    break;
                } else {
                    if(insize >= i + idx)
                        strTag[idx-1] = pData-->input_buf[i + idx];
                    else
                        break;
                }
                idx++;
            }
            bSkip = TRUE;
        }
    } else { // bSkip is true
        copyText[k++] = ch;
        // reset bLinkTag is reached end anchor
        if(ch == '<') {
            memset(strTag,NULL,MAX_PATH);
            int idx = 1;
            while (1) {
                if((insize >= i + idx) &&
                    (pData-->input_buf[i + idx] == '>' || pData-->input_buf[i + idx] == ' '))
                {
                    if(isLinkTag(strTag))
                        bLinkTag = TRUE;
                    else if(isLinkEndTag(strTag))
                        bLinkTag = FALSE;
                    break;
                } else {
                    if(insize >= i + idx)
                        strTag[idx-1] = pData-->input_buf[i + idx];
                    else
                        break;
                }
                idx++;
            }
        }
    }
```

```
                    break;
                }
            }
            if( (k + checkSpace) >= pData-->output_size) {
                int resize;
                resize = pData-->output_size + checkSpace;
                strcpy(pData-->output_buf,copyText);
                delete[ ] copyText;
                copyText=new char[resize];
                memset(copyText,NULL,resize);
                strcpy(copyText,pData-->output_buf);
                delete[ ] pData-->output_buf;
                pData-->output_buf = new char[resize];
                memset(pData-->output_buf,NULL,resize);
                pData-->output_size = resize;
            }
        }
        if(bNum) {
            if( k + checkSpace) >= pData-->output_size) {
                int resize;
                resize = pData-->output_size + checkSpace;
                strcpy(pData-->output_buf,copyText);
                delete[ ] copyText;
                copyText=new char[resize];
                memset(copyText,NULL,resize);
                strcpy(copyText,pData-->output_buf);
                delete[ ] pData-->output_buf;
                pData-->output_buf = new char[resize];
                memset(pData-->output_buf,NULL,resize);
                pData-->output_size = resize;
            }
            if(!IsValidNum(phoneNum)) {
                for(int n = 0; n < (int)strlen(dummyPhoneNum) ; n++) {
                    copyText[k++] = dummyPhoneNum[n];
                }
                memset(dummyPhoneNum,NULL,MAX_PATH);
            } else { // phone number is invalid
                for(int i = 0; i < (int)strlen(szInsertString1) ; i++) {
                    copyText[k++] = szInsertString1[i];
                }
                for(i = 0; i < (int)strlen(dummyPhoneNum) ; i++) {
                    if(dummyPhoneNum[i] >= '0' && dummyPhoneNum[i] <= '9')
                        copyText[k++] = dummyPhoneNum[i];
                }
                for(i = 0; i < (int)strlen(szInsertString2) ; i++) {
                    copyText[k++] = szInsertString2[i];
                }
                for(i = 0; i < (int)strlen(dummyPhoneNum) ; i++) {
                    copyText[k++] = dummyPhoneNum[i];
                }
                for(i = 0; i < (int)strlen(szInsertString3) ; i++) {
                    copyText[k++] = szInsertString3[i];
                }
                bRtn = TRUE;
            }
        }
        if(bRtn == TRUE) {
            delete[ ] pData-->output_buf;
            pData-->output_buf = new char[k + 1];//-1];
            memset(pData-->output_buf,NULL,k + 1);//-1);
            memcpy(pData-->output_buf,copyText,k-1);//2);
        }
        delete[ ] copyText;
        return bRtn;
}
void checkPhoneNumThread(void *pVoid)
{
        STRUCT_PROCESS *pData =(STRUCT_PROCESS *)pVoid;
        if(checkPhoneNum(pData))
            pData-->iCheckStatus = DO_SUCCESSEND;
        else
            pData-->iCheckStatus = DO_FAILEND;
}
void checkPhoneNumProc(STRUCT_PROCESS *pData)
{
            HANDLE hThread;
            DWORD nID;
            pData-->iCheckStatus = DO_START;
            hThread = CreateThread(
```

APPENDIX A-continued

```
                (LPSECURITY_ATTRIBUTES)NULL,      // No security attributes.
                (DWORD)0,                         // Use same stack size.
                (LPTHREAD_START_ROUTINE)checkPhoneNumThread, // Thread procedure.
                (LPVOID)pData,                    // Parameter to pass.
                (DWORD)0,                         // Run immediately.
                (LPDWORD)&nID);
        CloseHandle(hThread);
}
Filename: CIEHooker.h
// CIEHooker.h : Declaration of the CCIEHooker
#ifndef_CIEHOOKER_H_
#define_CIEHOOKER_H_
#include "resource.h"          // main symbols
#include "IEHookerCP.h"
#include "ExDispID.h"
#include "mshtmdid.h"
#include "mshml.h"
#include <strstrea.h>
#include "checkNum.h"
////////////////////////////////////////////////////////////////////////////////////////////////////////////////////////////////////////////
// CCIEHooker
class ATL_NO_VTABLE CCIEHooker :
        public CComObjectRootEx<CComSingleThreadModel>,
        public CComCoClass<CCIEHooker, &CLSID_CIEHooker>,
        public IObjectWithSiteImpl<CCIEHooker>,
        public ISupportErrorInfo,
        public IConnectionPointContainerImpl<CCIEHooker>,
        public IDispatchImpl<ICIEHooker, &HD_ICIEHooker, &LIBID_IEHookerLib>,
        public CProxy_ICIEHookerEvents< CCIEHooker >
{
public:
DECLARE_REGISTRY_RESOURCEID(IDR_CIEHOOKER)
DECLARE_PROTECT_FINAL_CONSTRUCT( )
BEGIN_COM_MAP(CCIEHooker)
        COM_INTERFACE_ENTRY(ICIEHooker)
        COM_INTERFACE_ENTRY(IDispatch)
        COM_INTERFACE_ENTRY(ISupportErrorInfo)
        COM_INTERFACE_ENTRY(IConnentionPointContainer)
        COM_INTERFACE_ENTRY(IObjectWithSite)
        COM_INTERFACE_ENTRY_IMPL(IConnectionPointContainer)
END_COM_MAP( )
BEGIN_CONNECTION_POINT_MAP(CCIEHooker)
        CONNECTION_POINT_ENTRY(DIID_ICIEHookerEvents)
END_CONNECTION_POINT_MAP( )
public:
        CCIEHooker( );
        ~CCIEHooker( );
        //
        // ISupportsErrorInfo
        //
        STDMETHOD(InterfaceSupportsErrorInfo) (REFIID riid);
    //
    // IDispatch Methods
    //
    STDMETHOD(Invoke)(DISPID dispidMember,REFIID riid, LCID lcid, WORD wFlags,
                    DISPPARAMS * pdispparams, VARIANT * pvasResult,
                    EXCEPINFO * pexcepinfo, UINT * puArgErr);
    //
    //    IOleObjectWithSite Methods
    //
        STDMETHOD(SetSite)(IUnknown *pUnkSite);
private:
        DWORD m_dwCookie; // Connection Token -- used for Advise and Unadvise
        CComQIPtr<IWebBrowser2, &IID_IWebBrowser2> m_spWebBrowser2;
        enum ConnectType { Advise, Unadvise }; // What to do when managing the connection
        BOOL ManageConnection(enum ConnectType eConnectType);
        void checkAllData( );
    void checkUpdate(STRUCT_PROCESS* pData);
        void EnumFrames( );
        void RecurseWindows(IHTMLDocument2* pDocument);
        BOOL GetPageBody(IHTMLDocument2* pDocument);
        BOOL AddData(STRUCT_PROCESS* pData);
        BOOL RemoveAll( );
        BOOL RemoveData(STRUCT_PROCESS* pData);
public:
};
#endif //_CIEHOOKER_H_
Filename: CIEHooker.cpp
// CIEHooker.cpp : Implementation of CCIEHooker
```

APPENDIX A-continued

```
#"stdafx.h"
#"IEHooker.h"
#"CIEHooker.h"
#<comdef.h>
////////////////////////////////////////////////////////////////////////////////////////////////////////////////////////////////////////////////////////////////
// CCIEHooker
#ifdef_DEBUG
#define new DEBUG_NEW
#undef THIS_FILE
static char THIS_FILE[ ]= _FILE_;
#endif
STRUCT_PROCESS *g_pHeaderData = NULL;
DWORD iCurrentTick = 0;
void EnablePhoneParse(BOOL bEnablePhoneParse)
{
        HKEY        hAppKey;
        DWORD       dwDisposition;
        if(RegCreateKeyEx(HKEY_LOCAL_MACHINE, TEXT("Software\\DialPad.com"), 0, NULL,
            REG_OPTION_NON_VOLATILE, KEY_WRITE, NULL, &hAppKey, &dwDisposition) == ERROR_SUCCESS)
        {
            RegSetValueEx(hAppKey, TEXT("EnablePhoneParse"), 0, REG_BINARY,(LPBYTE)&bEnablePhoneParse, sizeof(WORD));
            RegCloseKey(hAppKey);
        }
}
BOOL IsEnablePhoneParse( )
{
        HKEY        hAppKey;
        DWORD       bEnablePhoneParse = 0;
        DWORD       ulSize;
        if(RegOpenKeyEx(HKEY_LOCAL_MACHINE, TEXT("Software\\DialPad.com"), 0, KEY_READ,
            &hAppKey) == ERROR_SUCCESS)
        {
            ulSize = sizeof(DWORD);
            RegQueryValueEx(hAppKey, TEXT("EnablePhoneParse"), NULL, NULL,(LPBYTE)&bEnablePhoneParse, %ulSiz);
            RegCloseKey(hAppKey);
        }
        return (BOOL)bEnablePhoneParse;
}
CCIEHooker::CCIEHooker( )
{
}
CCIEHooker::~CCIEHooker( )
{
}
STDMETHODIMP CCIEHooker::InterfaceSupportsErrorInfo(REFIID riid)
{
/*  static const IID* arr[ ] =
        {
            &IID_ICIEHooker
        };
        for (int i=0; i < sizeof(arr) / sizeof(arr[0]); i++)
        {
            if (InlineIsEqualGUID(*arr[0]),riid))
                return S_OK;
        }
*/  return S_FALSE;
}
BOOL CCIEHooker::ManageConnection(enum ConnectType eConnectType)
{
    HRESULT hr;
    if (!m_spWebBrowser2) return S_OK;
    CComQIPtr<IConnectionPointContainer,
            &HD_IConnectionPointContainer> spCPContainer(m_spWebBrowser2);
    if (spCPContainer != NULL) {
        CComPtr<IConnectionPoint> spConnectionPoint;
        hr = spCPContainer-->FindConnectionPoint(DIID_DWebBrowserEvents2, &spConnectionPoint);
        if (SUCCEEDED(hr)) {
            if (eConnectType == Advise) {
                hr = spConnectionPoint-->Advise((IDispatch*)this, &m_dwCookie);
            }else {
                hr = spConnectionPoint-->Unadvise(m_dwCookie);
            }
        }
    }
    return (SUCCEEDED(hr));
}
STDMETHODIMP CCIEHooker::SetSite(IUnknown *pUnkSite)
{
        USES_CONVERSION;
```

APPENDIX A-continued

```
        if (!pUnkSite) {
            ATLTRACE("\nSetSite( ): pUnkSite is NULL\n\n");
        } else {
            m_spWebBrowser2 = pUnkSite;
            if (m_spWebBrowser2) {
                if (!ManageConnection(Advise)) {
                    ATLTRACE("Failure sinking events from IWebBrowser2");
                }
            }
        }
        return S_OK;
}
STDMETHODIMP CCIEHooker::Invoke(DISPID dispidMember,
                                REFID riid,
                                LCID lcid,
                                WORD wFlags,
                        DISPPARAMS* pDispParams,
                                VARIANT* pvarResult,
                        EXCEPINFO* pExcepInfo,
                                UINT* puArgErr)
{
    USES_CONVERSION;
    if (!pDispParams)
        return E_INVALIDARG;
    if(iCurrentTick) {
            DWORD iTmpTick = ::GetTickCount( );
            if(iTmpTick - iCurrentTick > 2000) {
                iCurrentTick = 0;
                EnumFrames( );
            }
    } else {
            CheckAllData( );
}
switch (dispidMember)
{
        case DISPID_DOCUMENTCOMPLETE;
            if(IsEnablePhoneParse( )) {
                if (pDispParams-->cArgs >= 2 && pDispParams-->rgvarg[1].vt == VT_DISPATCH) {
                    if(m_spWebBrowser2 == pDispParams-->rgvarg[1].pdispVal) {
                        iCurrentTick = 0;
                        RemoveAll( );
                        EnumFrames( );
                    } else {
                        iCurrentTick = ::GetTickCount( );
                    }
                }
            }
            break;
        case DISPID_BEFORENAVIGATE2:
            break;
        case DISPID_NAVIGATECOMPLETE2:
        case DISPID_STATUSTEXTCHANGE:
        case DISPID_PROGRESSCHANGE:
        case DISPID_DOWNLOADBEGIN:
        case DISPID_DOWNLOADCOMPLETE:
        case DISPID_COMMANDSTATECHANGE:
        case DISPID_NEWWINDOW2:
        case DISPID_BEFORENAVIGATE:
            break;
        case DISPID_ONQUIT:
            RemoveAll( );
            ManageConnection(Unadvise);
            break;
        default:
            break;
    }
    return S_OK;
}
void CCIEHooker::checkAllData( )
{
        STRUCT_PROCESS* pCurData = NULL;
        STRUCT_PROCESS* pNextData = NULL;
        if(g_pHeaderData) {
            try {
                pCurData = pNextData = g_pHeaderData;
                while(pNextData) {
                    pCurData = pNextData;
                    if(pCurData-->iCheckStatus == DO_SUCCESSEND)
                        checkUpdate(pCurData);
```

APPENDIX A-continued

```
                    pNextData = pCurData-->pNext;
                }
            }catch( . . . ) {
                ATLTRACE(__T("Unspecified exception thrown in checkAllData\n"));
            }
        }
}
void CCIEHooker::checkUpdate(STRUCT__PROCESS* pData)
{
        if(pData) {
            if(pData-->iCheckStatus == DO__SUCCESSEND) {
                try {
                    pData-->iCheckStatus = DO__IDLE;
                    int size = MultiByteToWideChar(CP__ACP,0,pData-->output__buf,-1,0,0);
                    if(pData-->output__size - pData-->input__size >= 0) {
                        IHTMLElement* pbody = NULL;
                        IHTMLDocument2* pHtmlDocument = pData-->pDocument;
                        if (pHtmlDocument) {
                            if (SUCCEEDED(pHtmlDocument-->get__body( &pbody))) {
                                if(pbody) {
                                        BSTR bstr;
                                        OLECHAR* olestr = new OLECHAR[size+1];
                                        olestr[0] = 0;
                                        int irtn = MultiByteToWideChar(CP__ACP,0,pData-->output__buf,size,olestr,size);
                                        bstr = SysAllocString(olestr);
                                        pbody-->put__innerHTML(bstr);
                                        SysFreeString(bstr);
                                        delete[ ] olestr;
                                }
                            }
                        }
                    }
                }catch(__com__error Error) {
                    ATLTRACE(Error.ErrorMessage( ));
                }catch( . . . ) {
                    ATLTRACE(__T("Unspecified exception thrown in checkUpdate\n"));
                }
            }
        }
}
BOOL checkChange(IHTMLDocument2* pDocument)
{
        STRUCT__PROCESS *pNextData = NULL;
        STRUCT__PROCESS *pCurData = NULL;
        if(g__pHeaderData == NULL)
            return TRUE;
        if(pDocument != g__pHeaderData-->pDocument)
            return TRUE;
        pCurData = pNextData = g__pHeaderData-->pNext;
        try {
            IHTMLFrmesCollection2* pFrameset = NULL;
            pDocument-->get__frames(&pFrameset):
            if(pFrameset) {
                IHTMLWindow2* pWindow2Next;
                IHTMLDocument2* pNextDoc;
                IHTMLElement* pbody;
                long len;
                pFrameset-->get__length(&len);
                for(long i = 0; i <len ; i++) {
                    __variant__t va(i, VT__I4);
                    VARIANT__result;
                    VariantInit(&__result);
                    pFrameset-->item(&va, &__result);
                    pWindow2Next = (IHTMLWindow2*)__result.pdispVal;
                    pWindow2Next-->get__document(&pNextDoc);
                    pCurData = pNextData;
                    if(pCurData) {
                        if(pCurData-->pDocument != pNextDoc) return TRUE;
                        pNextData = pCurData-->pNext;
                        if(pNextDoc) {
                            if(checkChange(pNextDoc)) return TRUE;
                        ]
                    } else {
                        if(pNextDoc) {
                            if(SUCCEEDED(pNextDoc-->get__body(&pbody))) {
                                if(pbody) {
                                    BSTR bstr;
                                    if(SUCCEEDED(pbody-->get__innerHTML(&bstr))) {
                                        if (bstr) return TRUE;
```

```
                                        }
                                    }
                                }
                                if(checkChange(pNextDoc)) return TRUE;
                            }
                        }
                    }
                }
            } catch( . . . ) {
                ATLTRACE(_T("Unspecified exception checkChange\n"));
            {
            return FALSE;
}
void CCIEHooker::EnumFrames( )
{
            IDispatch * pDisp;
            IHTMLDocument2* pDocument;
            try {
                if(SUCCEEDED(m_spWebBrowser2-->get_Document(&pDisp))) {
                    if(SUCCEEDED(pDisp-->QueryInterface(IID_IHTMLDocument2,void**)&pDocument))) {
                        if(pDocument) {
                            BOOL bcheck = checkChange(pDocument);
                            if(bcheck) {
                                RemoveAll( );
                                RecurseWindows(pDocument);
                            }
                        } else {
                            RemoveAll( );
                        }
                    }
                }
            } catch( . . . ) {
            ATLTRACE(_T("Unspecified exception EnumFrames\n"));
            }
}
void CCIEHooker::RecurseWindows(IHTMLDocument2* pDocument)
{
            IHTMLElement* pbody;
            if(pDocument == NULL) return;
            try {
                pDocument-->get_body( &pbody (;
                if(pbody) {
                    GetPageBody(pDocument);
                    // Get the IDispatch of the document
                    LPDISPATCH lpDisp = pDocument;
                    //lpDisp = m_webBrowser.GetDocument( );
                    if (lpDisp)
                    {
                        IOleContainer* pContainer;
                        // Get the container
                        HRESULT hr = lpDisp-->QueryInterface(IID_IOleContainer, (void**)&pContainer);
                        lpDisp-->Release( );
                        if (FAILED(hr))
                        {
                            return;
                        }
                        IEnumUnknown* pEnumerator;
                        hr = pContainer-->EnumObjects(OLECONTF_EMBEDDINGS, &pEnumerator);
                        pContainer-->Release( );
                        if (FAILED(hr))
                        {
                            return;
                        }
                        IUnknown* pUnk;
                        ULONG uFetched;
                        // Enumerate all the frames and process their html info
                        for (UINT i = 0; S_OK == pEnumerator-->NEXT(1, &pUnk, &uFetched); i++)
                        {
                            IWebBrowser2* pBrowser;
                            hr = pUnk-->QueryInterface(IID_IWebBrowser2,(void**)&pBrowser);
                            pUnk-->Release( );
                            if(SUCCEEDED(hr))
                            {
                                IDispatch* pDisp;
                                IHTMLDocument2* pDocument;
                                try {
                                    if(SUCCEEDED(pBrowser-->get_Document(&pDisp))) {
                                        if(SUCCEEDED(pDisp-->QueryInterface(IID_IHTMLDocument2,void**)&pDocument))) {
                                            if(pDocument) {
```

APPENDIX A-continued

```
        RecurseWindows(pDocument);
        pDocument-->Release( );
                                                    }
                                                }
                                            }
                                        } catch( . . . ) {
                                            ATLTRACE(__T("Unspecified exception EnumFrames\n"));
                                        }
                                    pBrowser-->Release( );
                                }
                            }
                            pEnumerator-->Release( );
                        }
                }
        } catch( . . . ) {
                ATLTRACE(__T("Unspecified exception RecurseWindows\n"));
        }
}
BOOL CCIEHooker::GetPageBody(IHTMLDocument2* pDocument)
{
        BSTR bstr;
        IHTMLElement* pbody = NULL;
        BOOL bSuccess = FALSE;
        try {
                STRUCT__PROCESS* pData = STRUCT__PROCESS;
                memset(pData,NULL,sizeof(STRUCT__PROCESS));
                if(SUCCEEDED(pDocument-->get__body(&pbody))) {
                        if(pbody) {
                                pbody-->get__innerHTML(&bstr);
                                if (bstr) {
                                        int bytes=WideCharToMultiByte(CP__ACP,0,bstr,-1,0,0,0,0);
                                        if (bytes) {
                                                char *buf=new char[bytes];
                                                memset(buf,NULL,bytes);
                                                WideCharToMultiByte(CP__ACP,0,bstr,-1,buf,bytes,0,0);
                                                pData-->input__buf = buf;
                                                pData-->input__size = bytes;
                                                pData-->pDocument = pDocument;
                                                checkPhoneNumProc(pData);
                                                bSuccess = TRUE;
                                        }
                                }
                        }
                }
                if (bSuccess)   AddData(pData);
                else            RemoveData(pData);
        } catch( . . . ) {
                ATLTRACE(__T("Unspecified exception thrown in GetPageBody\n"));
        }
        return TRUE;
}
BOOL CCIEHooker::AddData(STRUCT__PROCESS* pData)
{
        STRUCT__PROCESS* pCurData;
        STRUCT__PROCESS* pNextData;
        try {
                if(g__pHeaderData) {
                        pCurData = pNextData = g__pHeaderData;
                        while(pNextData) {
                                pCurData = pNextData;
                                pNextData = pNextData-->pNext;
                        }
                        pCurData-->pNext = pData;
                } else {
                        g__pHeaderData = pData;
                }
        } catch( . . . ) {
                ATLTRACE(__T("Unspecified exception thrown in AddData\n"));
        }
        return TRUE;
}
BOOL CCIEHooker::RemoveAll( )
{
        try {
                while(g__pHeaderData) {
                        STRUCT__PROCESS* pCurData = g__pHeaderData;
                        g__pHeaderData = pCurData-->pNext;
                        RemoveData(pCurData);
                }
```

APPENDIX A-continued

```
            g_pHeaderData = NULL;
        } catch( . . . ) {
            ATLTRACE(_T("Unspecified exception thrown in RemoveAll\n"));
        }
        return TRUE;
}
BOOL CCIEHooker::RemoveData(STRUCT_PROCESS* pData)
{
        try {
            if(pData != NULL) {
                pData-->bUserStop = TRUE;
                while(pData-->iCheckStatus == DO_CONTINUE) {
                    Sleep(10);
                }
                if(pData-->pDocument) {
                    pData-->pDocument-->Release( );
                    pData-->pDocument = NULL;
                }
                if(pData-->input_buf) {
                    delete[ ] pData-->input_buf;
                    pData-->input_buf = NULL;
                }
                if(pData-->output_buf) {
                    delete[ ] pData-->output_buf;
                    pData-->output_buf = NULL;
                }
                delete pData;
                pData = NULL;
            }
        } catch( . . . ) {
            ATLTRACE(_T("Unspecified exception thrown in RemoveData\n"));
        }
        return TRUE;
}
Filename: CIEHooker.lgs
HKCR
{
        IEHooker.CIEHooker.1 = s 'CIEHooker Class'
        {
            CLSID = s '{16122F02-9713-11D3-9744-005004116944}'
        }
        IEHooker.CIEHooker = s 'CIEHooker Class'
        {
            CLSID = s '{16122F02-9713-11D3-9744-005004116944}'
            CurVer = s 'IEHooker.CIEHooker.1'
        }
        NoRemove CLSID
        {
            ForceRemove {16122F02-9713-11D3-9744-005004116944} = s 'CIEHooker Class'
            {
                ProgID = s 'IEHooker.CIEHooker.1'
                VersionIndependentProgID = s 'IEHooker.CIEHooker'
                ForceRemove 'Programmable'
                InprocServer32 = s '%Module%'
                {
                    val ThreadingModel = 'Apartment'
                }
                'TypeLib' = s '{16122EF1-9713-11D3-9744-005004116944}'
            }
        }
}
HKLM
{
        SOFTWARE
        {
            Microsoft
            {
                Windows
                {
                    CurrentVersion
                    {
                        Explorer
                        {
                            'Browser Helper Objects'
                            {
                                {16122F02-9713-11D3-9744-005004116944}
                            }
                        }
                    }
```

APPENDIX A-continued

```
            }
        }
    }
}
```

APPENDIX B

Registry Modifications During Installation:
When Dialpad Everywhere is installed, the following folders are created:
HKEY_LOCAL_MACHINE/SOFTWARE/Microsoft/Windows/CurrentVersion/Explorer/'Browser Helper Objects'/{16122F02-9713-11D3-9744-005004116944}
HKEY_CLASSES_ROOT/IEHooker.CIEHooker.1
HKEY_CLASSES_ROOT/IEHooker.CIEHooker.1/CLSID
HKEY_CLASSES_ROOT/IEHooker.CIEHooker
HKEY_CLASSES_ROOT/IEHooker.CIEHooker/CLSID
HKEY_CLASSES_ROOT/IEHooker.CIEHooker/CurVer
The script for modifying the registry is contained in the CIEHooker.RGS file (text shown here):

```
HKCR
{
    IEHooker.CIEHooker.1 = s 'CIEHooker Class'
    {
        CLSID = s '{16122F02-9713-11D3-9744-005004116944}'
    }
    IEHooker.CIEHooker = s 'CIEHooker Class'
    {
        CLSID = s '{16122F02-9713-11D3-9744-005004116944}'
        CurVer = s 'IEHooker.CIEHooker.1'
    }
    NoRemove CLSID
    {
        ForceRemove {16122F02-9713-11D3-9744-005004116944} = s 'CIEHooker Class'
        {
            ProgID = s 'IEHooker.CIEHooker.1'
            VersionIndependentProgID = s 'IEHooker.CIEHooker'
            ForceRemove 'Programmable'
            InprocServer32 = s '%Module%'
            {
                val ThreadingModel = 'Apartment'
                }
                'TypeLib' = s '{16122EF1-9713-11D3-9744-005004116944}'
        }
    }
}
HKLM
{
    SOFTWARE
    {
        Microsoft
        {
            Windows
            {
                CurrentVersion
                {
                    Explorer
                    {
                        'Browser Helper Objects'
                        {
                            {16122F02-9713-11D3-9744-
005004116944}
                        }
                    }
                }
            }
        }
    }
}
```

Registry queries for setting/determining if phone parsing is turned on/off:

```
void EnablePhoneParse (BOOL bEnablePhoneParse)
{
    HKEY hAppKey;
    DWORD dwDisposition;
    if(RegCreateKeyEx (HKEY_LOCAL_MACHINE,
TEXT("Software\\DialPad.com"), 0, NULL,
        REG_OPTION_NON_VOLATILE, KEY_WRITE, NULL, &hAppKey,
&dwDisposition)
        == ERROR_SUCCESS)
```

APPENDIX B-continued

```
    {
        RegSetValueEx (hAppKey, TEXT {"EnablePhoneParse"), 0,
REG_BINARY, (LPBYTE) &bEnablePhoneParse, sizeof(WORD));
        RegCloseKey(hAppKey);
    }
}
BOOL IsEnablePhoneParse( )
{
        HKEY hAppKey;
        DWORD bEnablePhoneParse = 0;
        DWORD ulSize;
        if(RegCreateKeyEx (HKEY_LOCAL_MACHINE,
TEXT("Software\\DialPad.com"), 0, KEY_READ,
            &hAppKey} == ERROR_SUCCESS)
        {
            ulSize = sizeof(DWORD);
            RegQueryValueEx(hAppKey, TEXT("EnablePhoneParse"), NULL,
NULL, (LPBYTE) &bEnablePhoneParse, &ulSize);
            RegCloseKey(hAppKey);
        }
        return (BOOL) bEnablePhoneParse;
        }
```

We claim:

[1. A method for initiating internet telephone service from a web page containing a telephone number, comprising:

accessing said web page using a browser;

downloading a web page document associated with said web page;

parsing said web page document for detecting a character string representing a telephone number;

modifying said character string in said web page document into a link to said internet telephone service;

providing said web page document including said modified character string to said browser; and displaying said web page on said browser including said modified character string, wherein said act of parsing said web page for detecting a character string indicative of a telephone number comprises:

determining if said character string includes alphanumeric characters matching one of more predetermined telephone number formats; and if said character string matches a first one of said predetermined telephone number format, designating said character string as a telephone number.]

[2. The method of claim 1, further comprising:

selecting said modified character string indicative of said telephone number;

activating said link to said internet telephone service;

passing said telephone number to said internet telephone service;

initiating a telephone call to said telephone number; and establishing two-way communications between a caller selecting said character string and a destination audio device designated by said telephone number.]

[3. The method of claim 2, wherein said initiating a telephone call to said telephone number comprises:

launching a server side script at said internet telephone service for initiating said telephone call.]

[4. The method of claim 3, wherein said act of launching a server side script at said internet telephone service comprises:

determining if said caller has logged into said telephone service;

if said caller has not logged in, requesting said caller to log into said telephone service; and placing a telephone call to said telephone number through said internet telephone service.]

[5. The method of claim 1, wherein said one or more predetermined telephone number formats include at least one of the following: (###) ###-####, (###) ###-####, ###.###.####, ###/###/####, ###/###-####, ###-###-####), #-###-####, +# (###) ###-####, +# (###) ###-####, +# ### ### ####, +#-### ### ####, +#-### ###-####, +#-###-###-####, ### ### ####, ### ###.####, and ### ###-####, where # represents a digit between 0 and 9 or a character between A and Z.]

[6. The method of claim 5, wherein said one or more predetermined telephone number formats further include ##########, where the first three characters are numeric digit between 0 and 9.]

[7. The method of claim 1, wherein said act of parsing said web page further comprises:

determining if said character string is a hypertext link; and if said character string is a hypertext link, refraining from designating said character string as a telephone number even if said character string matches a first one of said predetermined telephone number format.]

[8. The method of claim 7, wherein said web page document is written in hypertext markup language (HTML) and said determining if said character string is a hypertext link comprises:

determining if said character string is preceded by the character A or a.]

[9. The method of claim 1, further comprising:

providing a caller-selectable interface for selectively enabling or disabling said acts of parsing said web page document and modifying said character string in said web page document.]

10. A method for initiating internet telephone service from a web page containing a telephone number, comprising:

accessing said web page using a browser;

downloading a web page document associated with said web page;

parsing said web page document for detecting a character string representing a telephone number, modifying said character string in said web page document into a link to said internet telephone service;

providing said web page document including said modified character string to said browser; and displaying said web pace on said browser including said modified character string, wherein said browser is Microsoft Internet Explorer and said method further comprises:

providing a Browser Helper Object including instructions for parsing said web page and modifying said character string indicative of said telephone number; and installing said Browser Helper Object, thereby activating said Browser Helper Object whenever said browser is activated.

11. A method for initiating internet telephone service from a web page containing a telephone number, comprising:

accessing said web page using a browser;

downloading a web page document associated with said web page;

parsing said web page document for detecting a character string representing a telephone number, modifying said character string in said web page document into a link to said internet telephone service;

providing said web page document including said modified character string to said browser; and displaying said web page on said browser including said modified character string, wherein said act of modifying said character string in said web page into a link to said internet telephone service comprises:

providing a first string including link information to said internet telephone service;

appending to said first string a first parameter containing said telephone number;

appending to said first parameter a second parameter containing said telephone number;

concatenating said first string, said first parameter and said second parameter to form said modified character string; and providing said modified character string to said browser for display.

12. The method of claim 11, wherein said appending to said first string a first parameter containing said telephone number comprises:

appending an international dialing access code to the beginning of said telephone number for forming said first parameter; and appending said first parameter to said first string.

13. A method for initiating internet telephone service from a web page containing a telephone number, comprising:

accessing said web page using a browser;

downloading a web page document associated with said web page;

parsing said web page document for detecting a character string representing a telephone number;

modifying said character string in said web page document into a link to said internet telephone service;

providing said web page document including said modified character string to said browser; and displaying said web page on said browser including said modified character string, wherein said act of modifying said character string in said web page into a link to said internet telephone service comprises:

providing a first string including link information to said internet telephone service;

appending to said first string a first parameter containing said telephone number;

providing a second string including window properties information for displaying a window of said internet service provider;

appending to said second string a second parameter containing said telephone number;

providing a third string including character formatting information; and concatenating said first string, said second string and said third string to form said modified character string; and providing said modified character string to said browser for display.

* * * * *

UNITED STATES PATENT AND TRADEMARK OFFICE

CERTIFICATE OF CORRECTION

PATENT NO. : RE 40,998 E
APPLICATION NO. : 11/644013
DATED : December 21, 2004
INVENTOR(S) : Wongyu Cho et al.

It is certified that error appears in the above-identified patent and that said Letters Patent is hereby corrected as shown below:

On title page, item 56, in column 2, under "Other Publications", line 5, delete "instanti" and insert -- instantj --, therefor.

On sheet 3 of 5, in figure 4, Reference Numeral 408, line 1, delete "telepone" and insert -- telephone --, therefor.

In column 1, line 35, delete "com,," and insert -- com, --, therefor.

In column 1, line 55, delete "H.323," and insert -- H.323 --, therefor.

In column 2, line 13, delete "service:" and insert -- service; --, therefor.

In column 3, line 12, delete "an" and insert -- any --, therefor.

In column 3, line 19, delete "entirety" and insert -- entirety. --, therefor.

In column 3, line 30, delete "communication" and insert -- connection --, therefor.

In column 6, line 7, delete "areas." and insert -- area. --, therefor.

In column 7, line 5, delete "call" and insert -- caller --, therefor.

In column 7, line 50, delete "becomes" and insert -- become --, therefor.

In column 8, line 60, delete "hyerplink." and insert -- hyperlink. --, therefor.

In column 8, line 64, delete "<Foot>" and insert -- <Font> --, therefor.

In column 9, line 4, delete "String]" and insert -- String1 --, therefor.

In column 9, line 45, delete "widow" and insert -- window --, therefor.

In column 10, line 22, delete "navigator." and insert -- Navigator. --, therefor.

In column 9, in APPENDIX A, line 2, delete "IEHooker.dil" and insert -- IEHooker.idl --, therefor.

In column 11, in APPENDIX A, line 7, delete "Interface")," and insert -- Interface") --, therefor.

In column 11, in APPENDIX A, line 8, above “dispinterface” insert -- ] --.

In column 11, in APPENDIX A, line 21, delete “[default]” and insert -- [default, source] --, therefor.

In column 13, in APPENDIX A, line 52, delete ““a”)” and insert -- “/a”) --, therefor.

In column 13, in APPENDIX A, line 52, delete ““A”)” and insert -- “/A”) --, therefor.

In column 15, in APPENDIX A, line 31, delete “routine:” and insert -- routine; --, therefor.

In column 17, in APPENDIX A, line 12, after “if(bNum)” delete “{”.

In column 17, in APPENDIX A, line 39, delete “[1+1]” and insert -- [i+1] --, therefor.

In column 17, in APPENDIX A, line 39, delete “onput” and insert -- input --, therefor.

In column 19, in APPENDIX A, line 5, delete “’=” and insert -- <= --, therefor.

In column 23, in APPENDIX A, line 28, delete “HD” and insert -- ID --, therefor.

In column 25, in APPENDIX A, line 1, delete “#“stdafx.h”” and insert -- #include “stdafx.h” --, therefor.

In column 25, in APPENDIX A, line 2, delete “#“IEHooker.h”” and insert -- #include “IEHooker.h” --, therefor.

In column 25, in APPENDIX A, line 3, delete “#“CIEHooker.h”” and insert -- #include “CIEHooker.h” --, therefor.

In column 25, in APPENDIX A, line 4, delete “#<comdef.h>” and insert -- #include <comdef.h> --, therefor.

In column 25, in APPENDIX A, line 63, delete “&HD” and insert -- &ID --, therefor.

In column 27, in APPENDIX A, line 14, delete “REFID” and insert -- REFIID --, therefor.

In column 29, in APPENDIX A, line 51, delete “Frmes” and insert -- Frames --, therefor.

In column 29, in APPENDIX A, line 52, delete “Frameset):” and insert -- Frameset); --, therefor.

In column 31, in APPENDIX A, line 11, delete “{” and insert -- } --, therefor.

In column 31, in APPENDIX A, line 41, delete “(;” and insert -- ); --, therefor.

In column 37, in APPENDIX B, line 2, after "following" insert -- registry --.

In column 41, line 5, in claim 10, delete "pace" and insert -- page --, therefor.

In column 42, line 16, in claim 13, delete "number;" and insert -- number, --, therefor.

Signed and Sealed this

Ninth Day of February, 2010

David J. Kappos

David J. Kappos
*Director of the United States Patent and Trademark Office*